No. 709,856. Patented Sept. 23, 1902.
E. WINANS.
POWER TRANSMITTING MACHINERY.
(Application filed June 10, 1902.)
(No Model.)
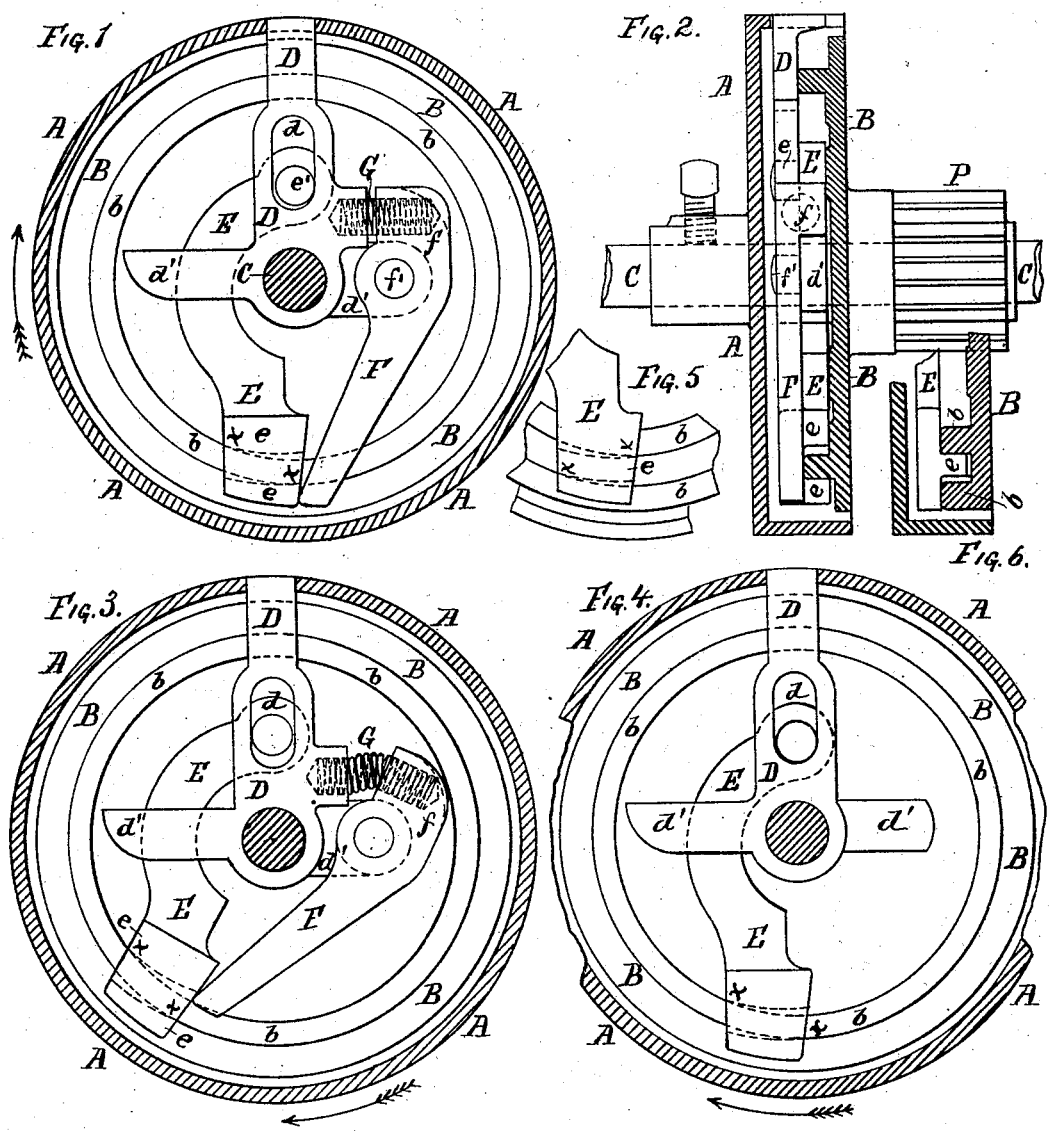
WITNESSES:-
CC Weightman
A. E. Platt.
INVENTOR:-
Edwin Winans
by Wm H Weightman
atty.

UNITED STATES PATENT OFFICE.

EDWIN WINANS, OF NEW YORK, N. Y.

POWER-TRANSMITTING MACHINERY.

SPECIFICATION forming part of Letters Patent No. 709,856, dated September 23, 1902.

Application filed June 10, 1902. Serial No. 111,012. (No model.)

*To all whom it may concern:*

Be it known that I, EDWIN WINANS, a citizen of the United States, residing in the city, county, and State of New York, have invented certain new and useful Improvements in Power-Transmitting Machinery, of which the following is a specification, reference being had to the accompanying drawings.

My invention relates to clutch or friction pulleys or couplings whereby power, motion, or revolution to be transmitted in any direction is passed automatically from a power or motion giving to a power or motion receiving medium; and the object of the invention is the production of a power-transmitting mechanism economical in its construction and operation, adaptable to a continuous shaft revolution, and especially adaptable to the intermittent application of power and motion through treadle mechanisms and the like.

My improvements consist in the special construction, arrangement, and combination of the several parts, portions, or details comprising the apparatus, as hereinafter set forth.

Referring to the accompanying drawings, Figure 1 represents a face view of the operative details of a power-transmitting device embodying my improvements. Fig. 2 represents a cross-section of the same. Fig. 3 represents a face view of the operative details with the fulcrum-grip in different position from that shown in Fig. 1. Fig. 4 represents the operative details of a coupling adapted to continuous revolution. Figs. 5 and 6 represent local modifications of the tongue-and-groove portions of clutch connection.

Similar letters of reference designate like parts, portions, or details in the several figures.

The letter A designates the shaft member of the power-transmitting device, representing the face, flange, or hub of a possible gear-wheel, pulley, or similar power and motion transmitting means, or where power and motion are to be transmitted through the supporting-shaft C it is preferably of cup or chamber shape to inclose the operative details secured to said shaft C by means of the usual set-screw, as shown in Fig. 2, or by any usual means.

Letter B designates the motion-giving member of the power-transmitting device, representing also the face, flange, or hub of a possible gear-wheel, pulley, or similar power and motion receiving means, said member being provided with a circular rib or wall $b$.

Letter D designates, as illustrated, a connecting-crank centering, snugly fitted, and free to revolve upon the shaft C and adapted to mesh or connect with the shaft member A as a means for the revolution of said member.

Letter E designates a grip or friction lever swinging upon a center $e'$ within a slot $d$ of connecting-crank D at one end and spanning rib or wall $b$ of motion-giving member B by means of jaws $e\ e$. Of course in this swinging connection between the grip-lever E and connecting-crank D the slot may be in grip-lever E and the pin be attached to connecting-crank D without marring the efficiency of either.

Letter F designates a pressure-pawl swinging upon a bearing or fulcrum $f'$, attached to the connecting-crank arm D in such manner as to effect a constant pressure upon the extremity or grip end of the lever E, and letter G designates a spring operating between the connecting-crank D and the operating end $f$ of said pressure-pawl F.

In the operation of the device, as illustrated by the several figures of the drawings, force and revolution applied to the gear-wheel P (shown in Fig. 2) are transmitted through member B and its rib $b$ to the grip or friction lever E, close contact being at all times maintained at the points or ends X X of the jaws $e\ e$ with said circular rib $b$ when moved in the direction as shown by the arrows by and through the swinging leverage of center $e'$ upon the contact points or tangents X X. The length of slot $d$ (whether in crank D or in the lever E) is governed by the amount of wear to be allowed for upon the jaws $e\ e$ or ribs $b$. Through the grip-lever E the force and revolution received are transferred to the connecting-crank D and thence to the shaft member A and to shaft C. To keep the grip-lever E up to an instantaneous duty, the spring-operated pressure-pawl F is kept to a constant pressure against its grip end, securing at all times and under all conditions a close contact of the points X X of jaws $e\ e$ upon the circular rib $b$, thereby effecting the instantaneous and positive grip absolutely necessary to the intermittent action of treadle or pendulum practice and assuring without backlash, rattle, or lost motion a constant and uninterrupted revolution of the operated shaft. If, again, it be desired to reverse the above operation, motion may be taken through shaft C and member A, thence transmitted to lever E through connecting-crank D, enforcing a grip contact at X X and effecting the revolution of B and its attached gear-wheel, pulley, or like contrivance in an opposite direction to that shown by arrow in the drawings, and, as before, the spring-operated pawl F is kept at a constant pressure against the grip end of lever E to secure instantaneous action for treadle or pendulum purposes. When an ordinary or continuous revolution only is desired and a single clutch is used, the pressure-pawl F is not essential and may be left out at will, as shown in Fig. 4. In Fig. 3 grip-lever E is shown moved to the left, as indicating the requirements of wear at contacts X X, the spring-operated pawl swung to a pressure contact with lever E by the extension of spring G.

In Figs. 5 and 6 a double rib b and single rib e are shown as forming the tongue-and-groove grip of lever E instead of the reverse, as shown in the other figures of the drawings, that shown in Figs. 5 and 6 being better adapted to larger sizes and powers and continuous revolution of a single clutch.

The arms $d'$ are applied and extended to act as guides and prevent the wabbling of the various parts, the aim and object being to have as little toolwork as possible in the interest of economy.

What I claim as new, and desire to secure by Letters Patent, is—

1. In a power-transmitting device or clutch, the combination with the driving and driven members thereof, of a crank connecting with one of said members; a grip-lever connecting with the other; and a slot-and-pin connection between said crank and lever substantially as and for the purposes set forth.

2. In a power-transmitting device or clutch, the combination with the driving and driven members thereof, of a crank connecting with one of said members; a grip-lever connecting with the other; a slot-and-pin connection between said crank and lever; and a spring-operated pawl pressing upon the grip end of said grip-lever, substantially as and for the purposes set forth.

EDWIN WINANS.

Witnesses:
WM. H. WEIGHTMAN,
C. C. WEIGHTMAN.